Feb. 22, 1966 L. F. DAY 3,236,474

REEL CONSTRUCTION

Filed Nov. 7, 1963

INVENTOR.
LUTHER F. DAY
BY Fraser and Bogucki
ATTORNEYS

United States Patent Office 3,236,474

Patented Feb. 22, 1966

3,236,474

REEL CONSTRUCTION

Luther F. Day, Hawthorne, Calif., assignor of forty percent to Fraser and Bogucki, Los Angeles, Calif., a partnership Filed Nov. 7, 1963, Ser. No. 322,250
3 Claims. (Cl. 242—74)

This invention relates to reels, and more particularly to those which are employed to receive windings of ribbon form, such as magnetic tape or film.

Ever since the advent of tape recorders and playback mechanisms, the problem of satisfactorily threading the end of the tape onto a takeup reel has plagued the operators of such devices. Some tapes are fashioned with a loop in the end thereof which may be fed through an opening in the hub of the takeup reel to be anchored by looping over the takeup reel drive spindle. In most cases, however, the tape has only a loose end which must somehow be anchored on the takeup reel assembly in order to start a tape winding operation.

A similar problem has long existed with respect to the winding of film on the takeup reel of a motion picture projector. Various attempts have been made to solve this problem with respect to both types of mechanisms. The problem is considered more acute, however, in the case of tape recorder and playback mechanism takeup reels because of the fact that conventional magnetic tape is more flexible and therefore more difficult to handle than motion picture film.

Among the arrangements which have been devised in attempts to solve the problem of winding tape and the like on a takeup reel are reels having special clips for locking the end of the tape in place, reels having various special configurations including a circular portion adjacent the hub and including a snubbing post about which the tape is to be folded and the like. It appears that the presently accepted conventional tape reel is the configuration which is dictated by the need for low fabrication cost, lightness in weight, and rigidity. The conventional reels in present use incorporate a loop region near the periphery of the hub with a snubbing post therein so that the end of the tape may be looped about the post to secure it in position. It may be that with a certain amount of practice and experience one gains a certain facility in using such an arrangement to start the winding of tape thereon. However, even for the most skilled operator, the step of starting the tape on such a takeup reel can on occasion be a frustrating experience. For one who is not practiced in this operation, the task is virtually impossible of accomplishment without several attempts. At the very least, it usually requires the use of both hands and may be helped considerably by the use of a special tool to grip the tape and direct it through the small openings provided in the conventional takeup reel construction.

It is therefore a general object of the present invention to provide an improved takeup reel construction.

It is a more specific object of the present invention to provide a takeup reel construction which is simpler and more effective in operation than those presently known.

It is a further object of the present invention to provide a takeup reel construction which can be threaded in a simple manner, is reliable in gripping the tape or film to be wound thereon, and which will readily release the tape or film therefrom as the ribbon-like material is rewound from the takeup reel.

In brief, the present invention involves a takeup reel construction having the usual hub and spaced annular flanges extending outwardly therefrom with a slot extending across the hub between two points on the periphery thereof and through one of the flanges so as to be completely open along one side of the slot. It is preferred that the slot be substantially straight and increase in width from a central portion towards the ends thereof. Arranged thusly, the slot permits the ready insertion of the end of a magnetic tape or any other ribbon-like material with a small portion, such as one-half the circumference of the hub or thereabouts, extending beyond the hub of the reel. When laid in the slot in this fashion, the tape is readily and automatically gripped so as to be securely wound on the takeup reel as soon as the forward drive control button of the tape drive mechanism is actuated. Operation is equally effective if the reel is simply rotated by hand. Insofar as the effectiveness of the operation of various arrangements in accordance with the invention is concerned, it makes no difference whether the rotation of the takeup reel is clockwise or counterclockwise. Put another way, it makes no difference whether the end of the tape or other ribbon-like material extending beyond the hub becomes snubbed around the minor portion or the major portion of the hub which is bifurcated by the slot. In either case, the loose end of the tape becomes snubbed about a portion of the hub on one side of the slot by the portion of the tape which is drawn on the hub as the takeup reel rotates.

In accordance with one particular aspect of the invention, the edges of the slot along the inner side of the upper reel flange where the slot intersects the flange are beveled in order to permit the use of a narrower slot. A tape reel having a narrower slot provides a stronger structure by virtue of the fact that more of the hub remains for attaching the bifurcated portions of the slotted flange. Furthermore, the beveled edges of the slotted flange counteract the tendency of the tape, particularly where extremely thin tape is used, to catch on the edges and become entangled. In accordance with another aspect of the invention, the circumferential surface of the hub is crowned slightly. This aspect of the invention causes the tape to ride to the center of the reel midway between the two flanges as it is being wound on the reel. This prevents the tape from riding up on one side of the reel, which as is known is a particular problem with the half-mil mylar tapes which are coming into common usage for tape recording.

In accordance with another aspect of the invention, an arrangement is provided which permits the use of an elastic rubber band or a short length of string as a retainer for the outer end of a length of tape which is wound upon the reel. Presently known arrangements resort to a number of different methods for retaining the loose end of a length of tape wound on a tape reel. None of these methods or structures is particularly practical and all of them are more or less awkward in practice. Tape reel arrangements in accordance with this aspect of the present invention have suitably spaced notches which may coact with the spaces in the upper flange provided by the threading slot to hold a plain rubber band or short length of string, thus providing an extremely simple and effective arrangement for holding the outer end of the wound tape against the reel for storage.

A better understanding of the present invention may be had by a consideration of the following detailed description, taken in conjunction with the accompanying drawing, in which.

Figure 1:
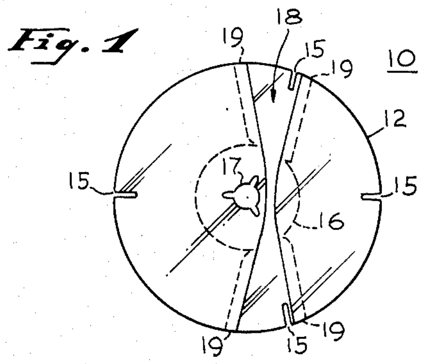
FIG. 1 is a plan view of one particular arrangement in accordance with the present invention.
Figure 2:
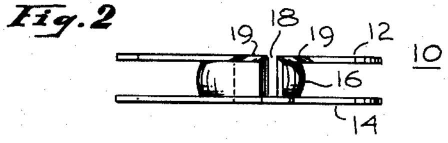
FIG. 2 is a side view of the arrangement in accordance with the invention shown in FIG. 1.
Figure 3:
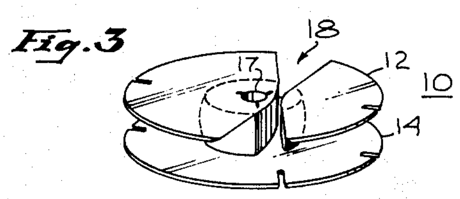
FIG. 3 is a perspective view of the arrangement in accordance with the invention shown in FIGS. 1 and 2.

In FIGS. 1–3, which are plan, side and perspective views respectively of one particular arrangement in accordance with the invention, a tape reel 10 is shown having an upper flange 12 and a lower flange 14 affixed to opposite sides of a hub 16. The flanges 12 and 14 are shown with a plurality of notches 15 for a purpose which will be described hereinbelow. The entire reel 10 is pierced by an opening 17 suitably shaped to engage the spindle of a tape reel drive mechanism of a tape recorder. Both the hub 16 and the upper flange 12 of the tape reel 10 are divided in two parts by a slot 18 which extends from one edge of the reel 10 to a point nearly opposite thereto. The slot 18 avoids extending along a diameter of the reel in order to pass around the opening 17, but in a preferred embodiment of the invention, the slot 18 passes as near to the opening 17 as is practical while maintaining sufficient reel body so that the opening 17 does not break into the slot 18. If desired, the slot 18 can be positioned farther from the diameter of the reel 10 and it may even be curved in its extent; however for purposes of the invention, it is preferred that the slot 18 have a shape such that a straight length of tape may be laid in the slot 18. At its midpoint, the slot 18 has a width of approximately ⅛ inch from whence it widens as it approaches the opposite edges of the upper flange 12 of the reel 10. However, the slot dimensions are not critical and are arranged to maintain the tape on edge as it rests in the slot while permitting positioning therein with ease.

As best seen in FIG. 2, the slot 18 is provided with beveled edges 19 in accordance with an aspect of the invention. These beveled edges 19 serve to prevent the tape from catching on the edges of the slot 18 and becoming entangled as it is wound about the hub 16. Moreover, this advantageous result provided by the beveled edges 19 permits the use of a narrower slot 18, thus permitting a stronger construction with more of the hub body retained on which to mount the bifurcated portions of the upper flange 12. It will also be noted in FIG. 2 that the circumferential edge of the hub 16 is slightly crowned. This particular construction in accordance with an aspect of the invention causes the tape to ride toward the center between the flanges 12 and 14 as it is being wound on the hub 16, thus preventing the tape from riding up on the flange 12 or the flange 14 during operation.

Figure 4:
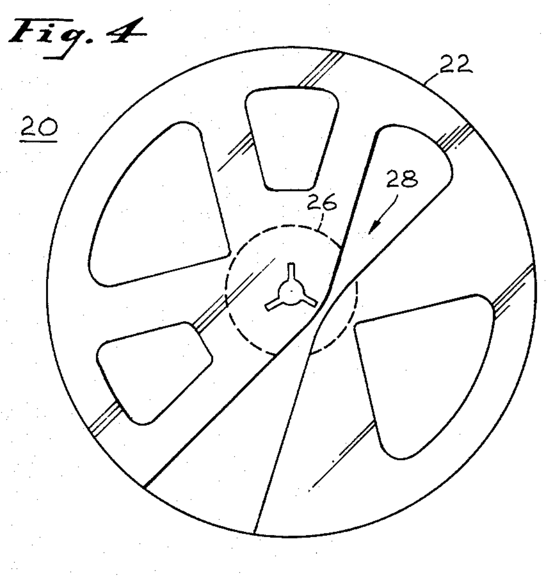
FIG. 4 is a plan view of a second particular arrangement in accordance with the invention.

FIG. 4 depicts a second particular arrangement in accordance with the invention for a tape storage reel, nominally 7 inches in diameter, as contrasted with the smaller takeup reel nominally 3 inches in diameter shown in FIGS. 1–3. In FIG. 4, a tape reel 20 is shown having an upper flange 22 and a slot 28 extending from one edge of the upper flange 22 across the hub 26 into a large opening in the upper flange 22 on the opposite side of the hub 26. In this arrangement in accordance with the invention it is not necessary that the slot 28 extend completely across the upper flange 22 since the large opening in the flange 22 to which the slot 28 is connected provides sufficient room for the end of the tape to be dropped therein as it is placed in the slot 28. This particular arrangement provides for increased strength and rigidity where large reels are employed. If desired, the slot 28 may extend only across the hub 26 between a pair of large openings in the flange 22. In such an arrangement the tape would be fed between the two flanges of the reel and dropped in the slot 28. Otherwise, the operation and use of the reel 20 in winding tape thereon is essentially the same as those employed in the smaller size reels.

Figures 5A, 5B, 6A, 6B:
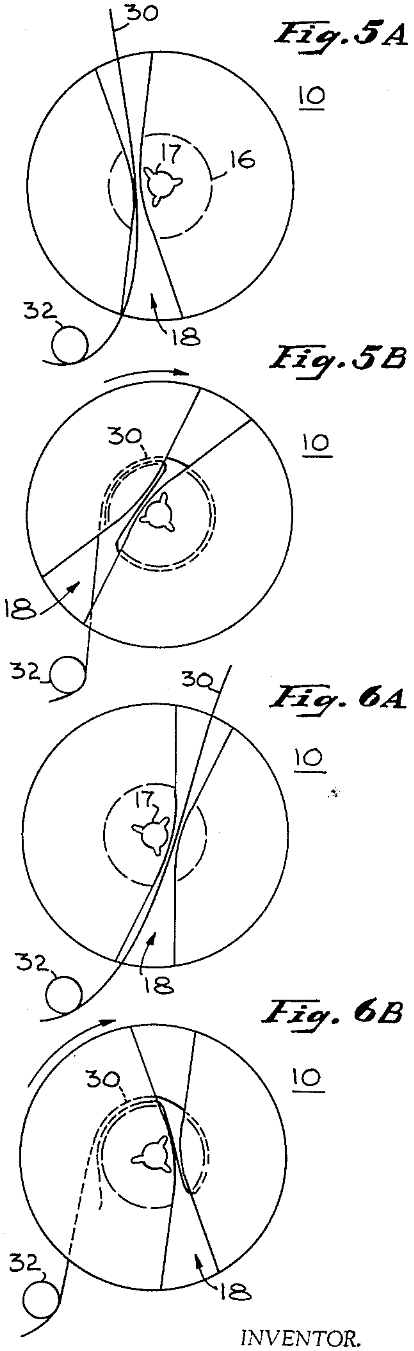
FIG. 5A is a representation of a tape reel of the invention in one particular position for fitting a tape thereon.
FIG. 5B is a representation of the tape reel of the invention showing tape being wound thereon after starting in the position of FIG. 5A.
FIG. 6A shows a tape reel in accordance with the invention in a second particular position for threading tape thereon.
FIG. 6B shows a tape reel in accordance with the invention with tape being wound thereon after starting in the position of FIG. 6A.

FIG. 5A shows a reel 10 with the end of a length of tape 30 in position ready to begin winding the tape 30 on the reel 10. A capstan 32 is shown around which the tape 30 passes as it is being wound on the reel 10. In FIGS. 5A, 5B, 6A and 6B, the hub 16 is shown in long-dashed outline in order to more readily distinguish it from the tape 30 being wound thereon which appears as a short-dashed line in FIGS. 5B and 6B. As shown in FIG. 5A, the reel 10 is in such a position as to place the slot 18 to the left of the central opening 17 on the spindle of the associated tape drive mechanism. In the operation of the depicted arrangement of the invention, the end of the tape 30 is simply laid in the slot 18 and the forward drive switch of the tape drive mechanism is actuated. Immediately the reel 10 is rotated in a clockwise direction and the tape 30 becomes securely snubbed about the hub 16 as shown in FIG. 5B so that the tape may be wound on the reel 10. This operation is effective in retaining the tape 30 on the reel 10 and is entirely automatic, as the inertia of the free end of the tape 30 carries it in a counter-clockwise direction around the hub 16. However, even though the tape 30 is securely snubbed to the hub 16 during the forward winding rotation of the reel 10, it is completely free for release from the reel 10 during the rewind process when the tape 30 is being taken off the reel 10 and rewound on the original reel (not shown).

FIG. 6A shows the reel 10 in a position with the slot 18 on the right-hand side of the spindle opening 17 and with the free end of the tape 30 placed in position in the slot 18. FIG. 6B shows the position of the tape 30 as the reel 10 is rotated clockwise from the starting position depicted in FIG. 6A. It can thus be seen that the tape 30 becomes snubbed on the reel 10 with equal facility, regardless of whether the reel 10 is positioned so that the slot 18 is on the right-hand or left-hand side of the spindle opening 17. Considered another way, it will be appreciated that it is of no consequence whether the rotation of the reel 10 is clockwise or counter-clockwise, insofar as the effectiveness of the operation of these arrangements in accordance with the invention is concerned.

Figure 7:
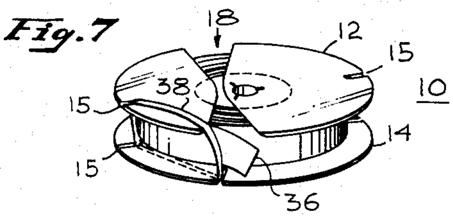
FIG. 7 is another view of an arrangement in accordance with the invention shown in FIGS. 1–3 with tape fully wound thereon and the free end being held in position by a retainer placed in accordance with an aspect of the invention.

FIG. 7 illustrates another aspect of the present invention wherein a plurality of notches 15 are positioned in the upper and lower flanges 12 and 14 of a tape reel 10 in accordance with the location of the slot 18 so that a retaining member 38 may be inserted therein for the purpose of securing the outer end 36 of tape which is to be stored on a reel 10. The retaining member 38 may advantageously be a small rubber band or a short length of string wound through the notches 15 and the edge of the slot 18 or it may comprise any other element which is suitable for this purpose. It has been found that this particular arrangement is considerably superior to the practice of using special clips which are inserted between the flanges 12 and 14 over the tape end 36, as well as being superior to other known arrangements for holding the loose end 36 in position.

Although there have been described above various arrangements of an improved reel structure in accordance with the invention for the purpose of illustrating preferred embodiments thereof, it will be appreciated that these are by way of illustration only and it is not intended that the scope of the invention be limited thereto. The invention has been shown and described in the context of a magnetic tape reel construction; however it should be clear that the principles of the invention are adaptable in general to any field of use where a ribbon-like material is to be threaded onto a reel for winding thereon. For example, the invention may be utilized in reels for motion picture film and for typewriter ribbon, to name a few. Accordingly, various other arrangements, modifications or variations may be developed by those skilled in the art without departing from the spirit and scope of the present invention as defined in the appended claims.

What is claimed is:

1. A magnetic tape reel comprising a central hub defining a central hole adapted to engage the spindle of a tape drive mechanism, and a pair of substantially parallel flanges connected to opposite ends of said hub, said hub defining a smooth non-diametral hub slot extending between two peripheral portions of the hub out of communication with said central hole, said slot having a single center point of convergence the width of which is less than the width of magnetic tape to be stored on the reel, said slot increasing symmetrically and continuously in width from said center point to opposite ends of said slot, one of said flanges defining a flange slot matching that of the hub slot increasing in width continuously symmetrically outwardly therefrom to opposite peripheral portions of said flange.

2. A magnetic tape reel in accordance with claim 1 wherein said hub includes a crowned circumferential edge adapted to position magnetic tape towards the center between said flanges during winding of said tape on said hub.

3. A magnetic tape reel in accordance with claim 1 wherein both of said flanges define a plurality of matching notches extending inwardly from the periphery thereof outside the areas defined by said flange slot and wherein said reel also includes a retaining member detachably connected to said notches and adapted to releasably secure magnetic tape when stored on the reel.

References Cited by the Examiner

UNITED STATES PATENTS

| | | | |
|---|---|---|---|
| 1,856,112 | 5/1932 | Porter | 242—74 |
| 2,467,607 | 4/1949 | Bates | 242—74 X |
| 2,574,883 | 11/1951 | Medal | 242—71.8 |
| 2,663,513 | 12/1953 | Hermann et al. | 242—74 X |
| 2,954,941 | 10/1960 | Hultgren | 242—74 |
| 2,974,892 | 3/1961 | Geloso | 242—74 X |

FOREIGN PATENTS

| | | |
|---|---|---|
| 1,191,627 | 4/1959 | France. |
| 957,887 | 2/1957 | Germany. |
| | | (Corresponding U.S., 2,746,692, May 22, 1956) |
| 172,399 | 12/1921 | Great Britain. |

MERVIN STEIN, *Primary Examiner.*